(12) United States Patent
Rodriguez

(10) Patent No.: US 11,755,757 B1
(45) Date of Patent: Sep. 12, 2023

(54) METHODS AND SYSTEMS FOR DETERMINING THE AUTHENTICITY OF AN IDENTITY DOCUMENT

(71) Applicant: Raphael A. Rodriguez, Marco Island, FL (US)

(72) Inventor: Raphael A. Rodriguez, Marco Island, FL (US)

( * ) Notice: Subject to any disclaimer, the term of this patent is extended or adjusted under 35 U.S.C. 154(b) by 0 days.

(21) Appl. No.: 17/971,961

(22) Filed: Oct. 24, 2022

(51) Int. Cl.
| | |
|---|---|
| G06F 40/194 | (2020.01) |
| G06F 21/62 | (2013.01) |
| G06K 7/14 | (2006.01) |
| G06V 20/00 | (2022.01) |
| G06V 30/418 | (2022.01) |
| G06V 30/413 | (2022.01) |

(52) U.S. Cl.
CPC ....... *G06F 21/6209* (2013.01); *G06K 7/1413* (2013.01); *G06V 20/95* (2022.01); *G06V 30/413* (2022.01); *G06V 30/418* (2022.01)

(58) Field of Classification Search
CPC ............. G06F 21/6209; G06V 30/413; G06V 30/418; G06V 20/95; G06K 7/1413
See application file for complete search history.

(56) References Cited

U.S. PATENT DOCUMENTS

| | | | |
|---|---|---|---|
| 5,576,528 A | 11/1996 | Chew et al. | |
| 7,931,194 B2 | 4/2011 | Keys | |
| 8,720,772 B2 | 5/2014 | Colman et al. | |
| RE44,982 E | 7/2014 | Cheong et al. | |
| 8,950,679 B2 | 2/2015 | Snelling et al. | |
| 9,938,667 B2 | 4/2018 | Olmos et al. | |
| 10,403,061 B2 | 9/2019 | Fankhauser et al. | |
| 10,721,429 B2 | 7/2020 | Wang et al. | |
| 11,010,423 B2 | 5/2021 | Roy et al. | |
| 11,422,030 B2 | 8/2022 | McQuilkin et al. | |
| 11,494,574 B2 | 11/2022 | Ciet et al. | |
| 11,531,810 B2 | 12/2022 | Mandelbaum et al. | |
| 2003/0057269 A1* | 3/2003 | Brunner ................. | G07F 17/42 235/375 |
| 2003/0089764 A1* | 5/2003 | Meadow ............... | G07F 7/1008 235/375 |

(Continued)

FOREIGN PATENT DOCUMENTS

EP 2 869 238 A1 5/2015

*Primary Examiner* — Vance M Little
(74) *Attorney, Agent, or Firm* — Kevin McDermott, Esq.

(57) ABSTRACT

A method for determining the authenticity of an identity document is provided that includes the steps of capturing, by an electronic device, image data of a PDF417 barcode, where the PDF417 barcode is located on an identity document including textual data. Moreover, the method includes the steps of extracting data from the PDF417 barcode, determining a class to which the identity document belongs using the extracted data, and identifying in the extracted data, data unique to the determined class. The unique data is in addition to the textual data. Furthermore, the method includes the steps of comparing the identified unique data against unique data of any authenticated identity document belonging to the determined class, calculating an authenticity score based on the comparison, and determining the identity document is authentic in response to determining the authenticity score satisfies a threshold score.

20 Claims, 6 Drawing Sheets

(56) References Cited

U.S. PATENT DOCUMENTS

| | | | |
|---|---|---|---|
| 2010/0228576 A1* | 9/2010 | Marti | G06Q 10/02 |
| | | | 715/764 |
| 2013/0197998 A1* | 8/2013 | Buhrmann | H04M 1/27 |
| | | | 726/3 |
| 2015/0108220 A1 | 4/2015 | Gu et al. | |
| 2017/0372289 A1* | 12/2017 | Fitzsimmons | G07G 1/0009 |
| 2019/0281036 A1* | 9/2019 | Eisen | G06F 21/31 |

* cited by examiner

88 →

| PDF417 BARCODE DECODED DATA |
|---|
| 636001030102DL00410234ZN0275 |
| 0070DLDCAID |
| DBA08032025 |
| DSCBEEBLEBROX — 90 |
| DCTZAPHOD — 92 |
| DBD06252021 |
| DBB08031975 — 94 |
| DBC1 |
| DAYBRO |
| DAU601 |
| DAG42MEANINGOFLIFELANE — 96 |
| DAIRICHMOND |
| DAJVA |
| DAK002631234 |
| DAQB123456789 — 98 |
| DCF5EEYRX6401 |
| DCGUSA |
| ZNZNBEEBLEBROX.ZAPHOD@GMAIL.COM |
| ZNB2F[R78'R>Q$3V%m[S6c? — 100 |
| (fBk4[cBBf'L']M%KT.( |

FIG. 8

| PDF417 BARCODE DECODED DATA |
|---|
| 636001030102DL00410234ZN0275 |
| 0070DLDCAID |
| DBA08032025 |
| DSCBEEBLEBROX —— 90 |
| DCTZAPHOD —— 92 |
| DBD06252021 |
| DBB08031975 —— 94 |
| DBC1 |
| DAYBRO |
| DAU601 |
| DAG42MEANINGOFLIFELANE —— 96 |
| DAIRICHMOND |
| DAJVA |
| DAK002631234 |
| DAQB123456789 —— 98 |
| DCF5EEYRX6401 |
| DCGUSA |
| ZNZNSPARKIE/\&.$-18&*)(Brutu$ |
| k1@#?l/OpiiB1UE)<>(":Adqwm6^&* —— 104 |
| L<?ZAPH!3$!~?\W-0/z+*"' |

102

METHODS AND SYSTEMS FOR DETERMINING THE AUTHENTICITY OF AN IDENTITY DOCUMENT

BACKGROUND OF THE INVENTION

This invention relates generally to authenticating identity documents, and more particularly, to methods and systems for determining the authenticity of an identity document.

Individuals conduct transactions with many different service providers in person and remotely over the Internet. Network-based transactions conducted over the Internet may involve, for example, opening a bank account or similar account using a website or mobile application. Service providers typically require successfully identifying an individual before he or she is permitted to open a bank account or conduct any other type of network-based transaction involving sensitive information.

Service providers typically require individuals to upload an image of his or her identity document, like a driver's license or a passport, and a claim of identity to facilitate authentication. The uploaded images are typically analyzed to determine whether the identity document in the uploaded image is authentic, unaltered, a live physical document, jurisdictionally accurate, and unexpired. The analysis may be manual or automatic.

Imposters have been known to impersonate individuals by providing a false claim of identity supported by a fraudulent identity document when attempting to deceive a service provider into concluding the imposter is the person he or she claims to be. Such impersonations are known as spoofing. Additionally, impostors have been known to use many methods to obtain or create fraudulent identity documents. For example, imposters have been known to alter identity documents by laminating another person's image onto their own identity document or to change the text of another person's identity document. The imposters upload images of the altered documents, for example, when attempting to open a bank account. Such fraudulent identity documents are difficult to detect using known techniques. Consequently, opening a banking account or other type of similar account with an uploaded image of an identity document captured at a remote location depends on verifying the identity document in the uploaded image is authentic.

Known methods for determining the authenticity of an identity document included in an image may analyze various features of the document, for example, the text font, presence of security features, and color spectrum, and may verify the uploaded image was not taken of a photocopy. The features may be analyzed manually or automatically.

However, manually reviewing uploaded identity documents is slow, inefficient, not scalable, and very expensive. Additionally, known methods of automatically analyzing identity documents typically generate results that are not as accurate and trustworthy as desired.

Thus, it would be advantageous and an improvement over the relevant technology to provide a method and a computer capable of enhancing the accuracy and trustworthiness of authenticity detection results, enhancing security, facilitating a reduction in identity document review costs, and facilitating a reduction in costs incurred due to successful spoofing attacks.

BRIEF DESCRIPTION OF THE INVENTION

An aspect of the present disclosure provides a method for determining the authenticity of an identity document that includes the steps of capturing, by an electronic device, image data of a PDF417 barcode, where the PDF417 barcode is located on an identity document including textual data. Moreover, the method includes the steps of extracting data from the PDF417 barcode, determining a class to which the identity document belongs using the extracted data, and identifying in the extracted data, data unique to the determined class. The unique data is in addition to the textual data. Furthermore, the method includes the steps of comparing the identified unique data against unique data of any authenticated identity document belonging to the determined class, calculating an authenticity score based on the comparison, and determining the identity document is authentic in response to determining the authenticity score satisfies a threshold score.

In one embodiment of the present disclosure the method further includes the step of comparing the identified unique data against the unique data in each fraudulent identity document included in a database of fraudulent identity documents when the authenticity score fails to satisfy the threshold score. Each fraudulent identity document is associated with a manufacturer. Moreover, the method includes the step of determining the manufacturer of the identity document including the identified unique data when the identified unique data matches the unique data in at least one fraudulent identity document.

In another embodiment of the present disclosure the method further includes the step of determining the identity document is fraudulent in response to determining the authenticity score fails to satisfy the threshold score.

In yet another embodiment of the present disclosure the identifying step includes the steps of searching the extracted data to identify the unique data and determining the identity document is fraudulent in response to failing to identify the unique data.

In another embodiment of the present disclosure the identity document includes a first side and a second side, and the capturing step includes the step of capturing an image of the first side of the identity document. The first side of the identity document includes the textual data. Moreover, the capturing step includes the step of capturing an image of the second side of the identity document. The second side of the identity document includes the PDF417 barcode.

In another embodiment of the present disclosure the identified unique data was intentionally included in the PDF417 barcode by a manufacturer of the PDF417 barcode.

In another embodiment of the present disclosure the identified unique data was unintentionally included in the PDF417 barcode by a manufacturer of the PDF417 barcode.

An aspect of the present disclosure provides a non-transitory computer-readable recording medium in an electronic device capable determining the authenticity of identity documents. The non-transitory computer-readable recording medium stores instructions which when executed by a hardware processor performs the steps of the methods described above.

Another aspect of the present disclosure provides an electronic device for determining authenticity of an identity document including a processor and a memory configured to store data. The electronic device is associated with a network and the memory is in communication with the processor and has instructions stored thereon which, when read and executed by the processor, cause the electronic device to receive image data of a PDF417 barcode. The PDF417 barcode is located on an identity document that includes textual data. Moreover, the instructions when read and executed by the processor, cause the electronic device to extract data from the PDF417 barcode, determine a class to which the identity document belongs using the extracted data, and identify in the extracted data, data unique to the determined class. The unique data is in addition to the textual data. Furthermore, the instructions when read and executed by the processor, cause the electronic device to compare the identified unique data against unique data of any authenticated identity document belonging to the determined class, calculate an authenticity score based on the comparison, and in response to determining the authenticity score satisfies a threshold score, determine the identity document is authentic.

In an embodiment of the present disclosure, the instructions when read and executed by the processor, further cause the electronic device to compare the identified unique data against the unique data in each fraudulent identity document included in a database of fraudulent identity documents when the authenticity score fails to satisfy the threshold score. Each fraudulent identity document is associated with a manufacturer. Moreover, the instructions when read and executed by the processor, further cause the electronic device to determine the manufacturer of the identity document including the identified unique data when the identified unique data matches the unique data in at least one fraudulent identity document.

In another embodiment of the present disclosure, the instructions when read and executed by the processor, further cause the electronic device to determine the identity document is fraudulent in response to determining the authenticity score fails to satisfy the threshold score.

In another embodiment of the present disclosure, the instructions when read and executed by the processor, further cause the electronic device to search the extracted data to identify the unique data and determine the identity document is fraudulent in response to failing to identify the unique data.

In another embodiment of the present disclosure the identity document includes a first side and a second side, and the instructions when read and executed by the processor, cause the electronic device to capture an image of the first side of the identity document and capture an image of the second side of the identity document. The first side of the identity document includes the textual data, and the second side of the identity document includes the PDF417 barcode.

In another embodiment of the present disclosure the identified unique data was intentionally included in the PDF417 barcode by a manufacturer of the PDF417 barcode.

In another embodiment of the present disclosure the identified unique data was unintentionally included in the PDF417 barcode by a manufacturer of the PDF417 barcode.

BRIEF DESCRIPTION OF THE DRAWINGS

FIG. 8 is a table including example decoded PDF417 barcode data;

DETAILED DESCRIPTION OF THE INVENTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the example embodiments described herein can be made without departing from the spirit and scope of the present disclosure.

Figure 1:
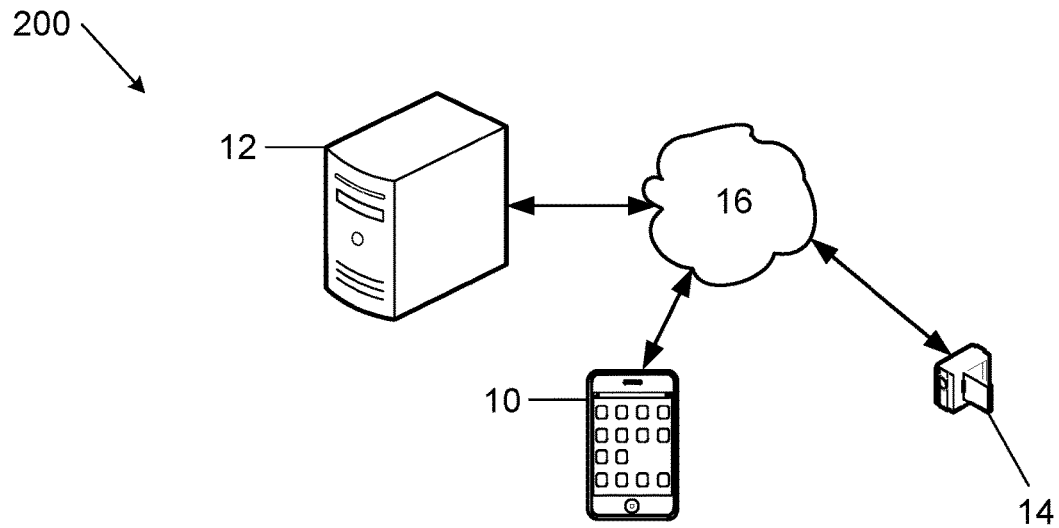
FIG. 1 is a schematic diagram of an example computing system for determining the authenticity of an identity document according to an embodiment of the present disclosure.

FIG. 1 is a schematic diagram of an example computing system 200 for determining the authenticity of an identity document according to an embodiment of the present disclosure. As shown in FIG. 1, the main elements of the system 200 include an electronic device 10, a server 12, and a camera 14 communicatively connected via a network 16.

In FIG. 1, the electronic device 10 can be any electronic device capable of at least downloading applications over the Internet, running applications, capturing and storing data temporarily and/or permanently, and otherwise performing any and all functions, methods and/or algorithms described herein by any computer, computer system, server or electronic device that may be included in the system 200. For example, the electronic device 10 may be any type of server or computer implemented as a network server or network computer. Other examples of the electronic device 10 include, but are not limited to, a cellular phone, any wireless hand-held consumer electronic device, a smart phone, a tablet computer, a phablet computer, a laptop computer, and a personal computer (PC).

The electronic device 10 is typically associated with a single person who operates the device 10. The person who is associated with and operates the electronic device 10 is referred to herein as a user.

The server 12 can be, for example, any type of server or computer implemented as a network server or network computer. The camera 14 may be any type of camera capable of capturing any kind of image data and audio data. The server 12 and camera 14 are electronic devices so may be alternatively referred to as an electronic device. Additionally, the electronic device 10, the server 12, and the camera 14 may each be considered information systems so may alternatively be referred to as an information system.

The network 16 may be implemented as a 5G communications network. Alternatively, the network 16 may be implemented as any wireless network including, but not limited to, 4G, 3G, Wi-Fi, Global System for Mobile (GSM), Enhanced Data for GSM Evolution (EDGE), and any combination of a LAN, a wide area network (WAN) and the Internet. The network 16 may also be any type of wired network or a combination of wired and wireless networks.

It is contemplated by the present disclosure that the number of electronic devices 10, servers 12, and cameras 14 is not limited to the number shown in the system 200. Rather, any number of electronic devices 10, servers 12, and cameras 14 may be included in the system 200.

Figure 2:
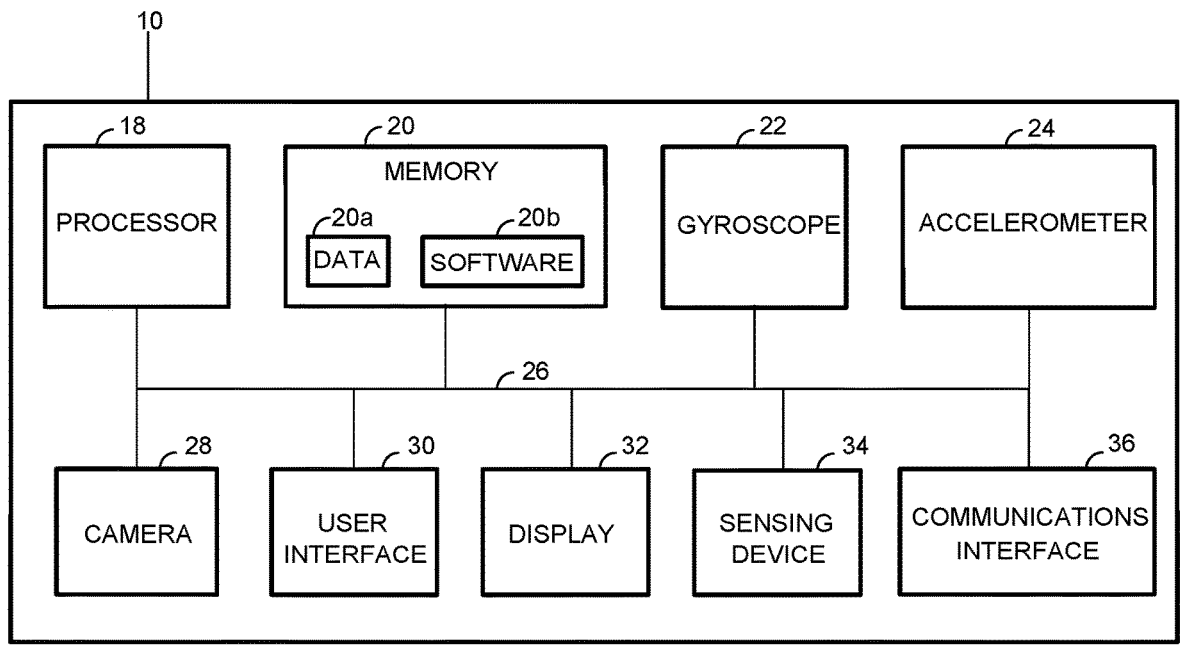
FIG. 2 is a schematic diagram of an example electronic device included in the system shown in FIG. 1.

FIG. 2 is a more detailed schematic diagram of the electronic device 10 for determining the authenticity of an identity document according to an embodiment of the present disclosure. The computing device 10 includes components such as, but not limited to, one or more processors 18, a memory 20, a gyroscope 22, an accelerometer 24, a bus 26, a camera 28, a user interface 30, a display 32, a sensing device 34, and a communications interface 36. General communication between the components in the computing device 10 is provided via the bus 26.

The electronic device 10 can be any electronic device capable of at least downloading applications over the Internet, running applications, capturing and storing data temporarily and/or permanently, and otherwise performing any and all functions described herein by any computer, computer system, server or electronic device. For example, the electronic device 10 may be any type of server or computer implemented as a network server or network computer. Other examples include, but are not limited to, a cellular phone, any wireless hand-held consumer electronic device, a smart phone, a tablet computer, a phablet computer, a laptop computer, and a personal computer (PC).

The processor 18 executes software instructions, or computer programs, stored in the memory 20. As used herein, the term processor is not limited to just those integrated circuits referred to in the art as a processor, but broadly refers to a computer, a microcontroller, a microcomputer, a programmable logic controller, an application specific integrated circuit, and any other programmable circuit capable of executing at least a portion of the functions and/or methods described herein. The above examples are not intended to limit in any way the definition and/or meaning of the term "processor."

The memory 20 may be any non-transitory computer-readable recording medium. Non-transitory computer-readable recording media may be any tangible computer-based device implemented in any method or technology for short-term and long-term storage of information or data. Moreover, the non-transitory computer-readable recording media may be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), and disc drive or the like. Furthermore, the non-transitory computer-readable recording media may be implemented as smart cards, SIMs, any type of physical and/or virtual storage, or any other digital source such as a network or the Internet from which computer programs, applications or executable instructions can be read.

The memory 20 may be used to store any type of data 20a, for example, data records of users and a database of images in which each image is of an identity document. Each data record is typically for a respective user. The data record for each user may include data such as, but not limited to, the user's name, personal data, and images of identity documents associated with the user. Identity documents include, but are not limited to, passports, driver's licenses, and identity cards.

The term "personal data" as used herein includes any demographic information regarding a user as well as contact information pertinent to the user. Such demographic information includes, but is not limited to, a user's name, age, date of birth, street address, email address, citizenship, marital status, and contact information. Contact information can include devices and methods for contacting the user.

Additionally, the memory 20 can be used to store any type of software 20b. As used herein, the term "software" is intended to encompass an executable computer program that exists permanently or temporarily on any non-transitory computer-readable recordable medium that causes the electronic device 10 to perform at least a portion of the functions, methods, and/or algorithms described herein.

Application programs 32 are software and include, but are not limited to, operating systems, Internet browser applications, enrolment applications, authentication applications, user liveness detection applications, identity document liveness detection applications, machine learning models that facilitate determining whether identity documents included in image data are authentic, applications that use pre-trained models based on machine learning algorithms, machine learning algorithms, feature vector generator applications, and any special computer program that manages the relationship between application software and any suitable variety of hardware that helps to make-up a computer system or computing environment.

Authentication applications enable the computing device 10 to conduct user verification and identification (1:N) transactions with any type of authentication data, where "N" is a number of candidates. Identity liveness detection applications facilitate confirming that an original identity document was present when image data of the identity document was captured. For example, identity liveness detection applications may confirm that the identity document in captured image data was not a photograph of the original identity document.

Machine learning algorithm applications include at least classifiers and regressors. Examples of machine learning algorithms include, but are not limited to, support vector machine learning algorithms, decision tree classifiers, linear discriminant analysis learning algorithms, and artificial neural network learning algorithms. Decision tree classifiers include, but are not limited to, random forest algorithms. The software may also include computer programs that implement buffers and use RAM to store temporary data.

The camera 22 captures image data. As used herein, capture means to record data temporarily or permanently, for example, image data of identity documents. The camera 22 can be one or more imaging devices configured to record image data of identity documents of a user while utilizing the computing device 10. Moreover, the camera 22 is capable of recording image data under any lighting conditions including infrared light. The camera 22 may be integrated into the computing device 10 as one or more front-facing cameras and/or one or more rear facing cameras that each incorporates a sensor, for example and without limitation, a CCD or CMOS sensor. Alternatively, the camera 22 can be external to the computing device 10.

The user interface 30 and the display 32 allow interaction between a user and the electronic device 10. The display 32 may include a visual display or monitor that displays information. For example, the display 32 may be a Liquid Crystal Display (LCD), an active matrix display, plasma display, or cathode ray tube (CRT). The user interface 30 may include a keypad, a camera, a keyboard, a mouse, an illuminator, a signal emitter, a microphone, and/or speakers.

Moreover, the user interface 30 and the display 32 may be integrated into a touch screen display. Accordingly, the display may also be used to show a graphical user interface, which can display various data and provide "forms" that include fields that allow for the entry of information by the user. Touching the screen at locations corresponding to the display of a graphical user interface allows the person to interact with the electronic device 10 to enter data, change settings, control functions, etc. Consequently, when the touch screen is touched, the user interface 30 communicates this change to the processor 18 and settings can be changed or user entered information can be captured and stored in the memory 20.

The sensing device 34 may include Radio Frequency Identification (RFID) components or systems for receiving information from other devices (not shown) and for transmitting information to other devices. The sensing device 34 may alternatively, or additionally, include components with Bluetooth, Near Field Communication (NFC), infrared, or other similar capabilities. Communications between the electronic device 10 and other devices (not shown) may occur via NFC, RFID, Bluetooth or the like only so a network connection from the electronic device 10 is unnecessary.

The communications interface 36 may include various network cards, and circuitry implemented in software and/or hardware to enable wired and/or wireless communications with other devices (not shown). Communications include, for example, conducting cellular telephone calls and accessing the Internet over a network. By way of example, the communications interface 24 may be a digital subscriber line (DSL) card or modem, an integrated services digital network (ISDN) card, a cable modem, or a telephone modem to provide a data communication connection to a corresponding type of telephone line. As another example, the communications interface 36 may be a local area network (LAN) card (e.g., for Ethernet.TM. or an Asynchronous Transfer Model (ATM) network) to provide a data communication connection to a compatible LAN. As yet another example, the communications interface 36 may be a wire or a cable connecting the electronic device 10 with a LAN, or with accessories such as, but not limited to, other electronic devices. Further, the communications interface 36 may include peripheral interface devices, such as a Universal Serial Bus (USB) interface, a PCMCIA (Personal Computer Memory Card International Association) interface, and the like.

The communications interface 36 also allows the exchange of information across a network between the electronic device 10 and any other device (not shown). The exchange of information may involve the transmission of radio frequency (RF) signals through an antenna (not shown).

Identity documents may be one of three different card types. The card types are ID-1, ID-2 and ID-3. International standards defining the size of each card type have been established. For example, the international standard for ID-1 card types requires that the card be rectangular with dimensions of 85.60 millimeters (mm) by 53.98 mm, and have rounded corners with a radius in the range of 2.88 mm to 3.48 mm. Cards implemented using the ID-1 card type standard include, but are not limited to, credit cards, debit cards, identification cards, hunting licenses and driver's licenses. Example implementations of the ID-2 card type standard include travel visas and Romanian identity cards. An example implementation of the ID-3 card type standard is a passport.

Each different implementation using the ID-1 card type standard may be considered a different class. As a result, there are several hundred different classes. For example, driver's licenses implemented using the ID-1 standard may be considered one class, credit cards implemented using the ID-1 standard may be considered another class, and hunting licenses implemented using the ID-1 standard may represent yet another class.

It is contemplated by the present disclosure that the driver's license implemented using the ID-1 standard issued by each U.S. state constitutes a different class. Thus, for example, a driver's license issued by the state of California belongs to a different class than a driver's license issued by the state of Florida. Similarly, the driver's licenses issued by different provinces, for example, in Canada constitute different classes. Thus, for example, a driver's license issued by the province of Quebec belongs to a different class than a driver's license issued by the province of Ontario. Moreover, driver's licenses issued in different years constitute a different class. Thus, for example, a California driver's license issued in 2018 belongs to a different class than a California driver's license issued in 2021. Commercial driver's licenses also constitute a different class of document.

Figure 3:
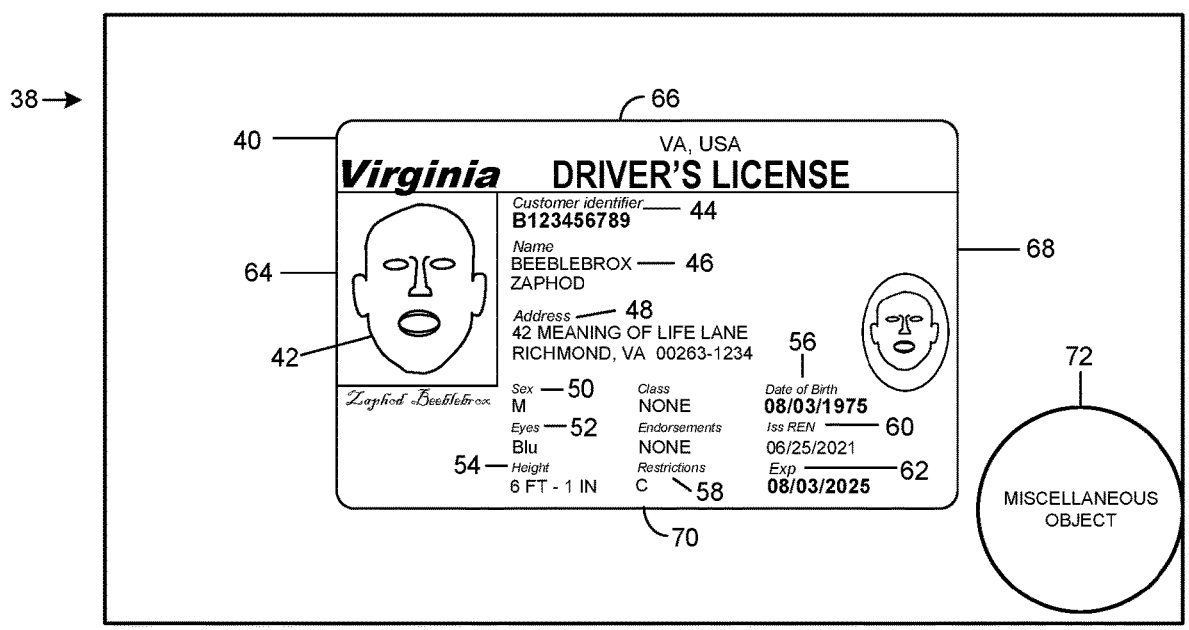
FIG. 3 is a diagram illustrating image data including an image of an example identity document implemented using the ID-1 card type.

FIG. 3 is a diagram illustrating image data 38 including an image of an example identity document 40 implemented using the ID-1 card type standard. An example first side of the identity document 40 is shown. The example identity document 40 is a driver's license. However, it is contemplated by the present disclosure that the identity document 40 may alternatively be any identity document that includes a PDF417 barcode used by a person to prove a claim of identity, for example, an identification card. The image may be captured with the electronic device 10, the camera 14 or any other device included in the system 200 capable of communicating with the server 12 via the network 16. Scanners may be used to read and decode PDF417 barcodes.

The identity document 40 includes an image 42 of the person to whom the identity document was issued and identifying information. Identifying information may include information about the person to whom the identity document 40 was issued as well as general information relating to the identity document 40. The identifying information can include, but is not limited to, a customer identifier 44 as well as the person's name 46, address 48, sex 50, eye color 52, height 54, and date of birth 56. Identity information can also include, but is not limited to, restrictions 58 the person is required to comply with while driving, the issue renewal date 60, the expiration date 62 of the identity document 40, and the state and/or country that issued the identity document 40. The identity information is typically in text which may be obtained or extracted from the identity document 40 using optical character recognition (OCR) techniques. All images, identifying information and any other information included on the first side of the identity document 40 complies with the criteria established for the class to which the identity document 40 belongs. The identity document 40 has a left edge 64, a top edge 66, a right edge 68, and a bottom edge 70.

Image data 38 is frequently captured by users informally photographing their own identity documents 40. For example, users may photograph identity documents 40 positioned on the kitchen table, a dresser, a desk or a bureau. As a result, image data 38 of identity documents 40 frequently includes miscellaneous objects 72. The miscellaneous object 72 may be any kind or type of object deliberately or accidentally included in the image data 38 of the identity document 40. For example, the miscellaneous object 72 may be a coffee mug, comb, brush, sandwich, pen, pencil, computer, tool or weapon. The number of miscellaneous objects 72 is not limited to the number shown. Rather, any number of miscellaneous objects 72 may be included in the image data 38 of the identity document 40.

The miscellaneous object 72 may be removed from the image data 38 by cropping the image data 38 to include the identity document 40 only. Alternatively, the miscellaneous object 72 may be removed in any other manner. Additionally, depending on the size and orientation of the identity document 40 in the image data 38, the image data 38 may be rotated, scaled, de-skewed, and perhaps corrected for lighting to manipulate the identity document 40 to be properly analyzed.

The miscellaneous object 72 constitutes background information that alone or in combination with other data can be used to facilitate detecting fraudulent identity documents. For example, the miscellaneous object 72 in image data 38 including a fraudulent identity document may be compared against the miscellaneous object 72 in image data of other identity documents. If the miscellaneous objects 72 are the same or substantially the same, the respective other identity documents may be fraudulent.

Figure 4:
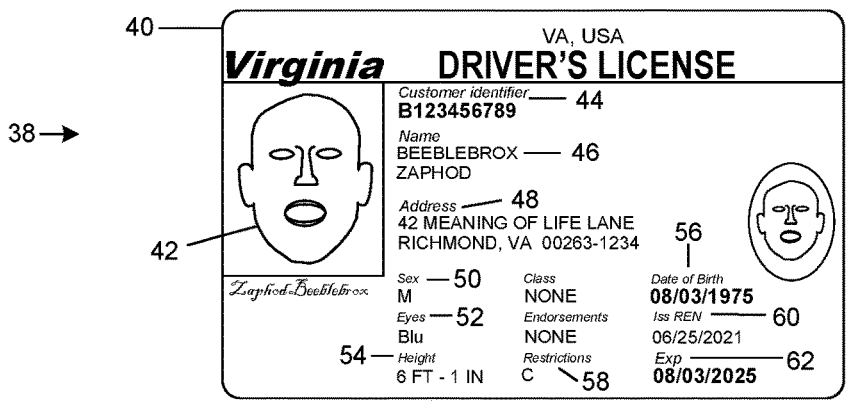
FIG. 4 is a diagram illustrating the image data after cropping the image of the example identity document.

FIG. 4 is a diagram illustrating the image data 38 after cropping and includes the identity document 40 only. Cropped image data 38 may be stored in the memory 20 of the electronic device 10, the server 12 or any other computer server or electronic device capable of communicating via the network 16 that may be included in the system 200.

Figure 5:
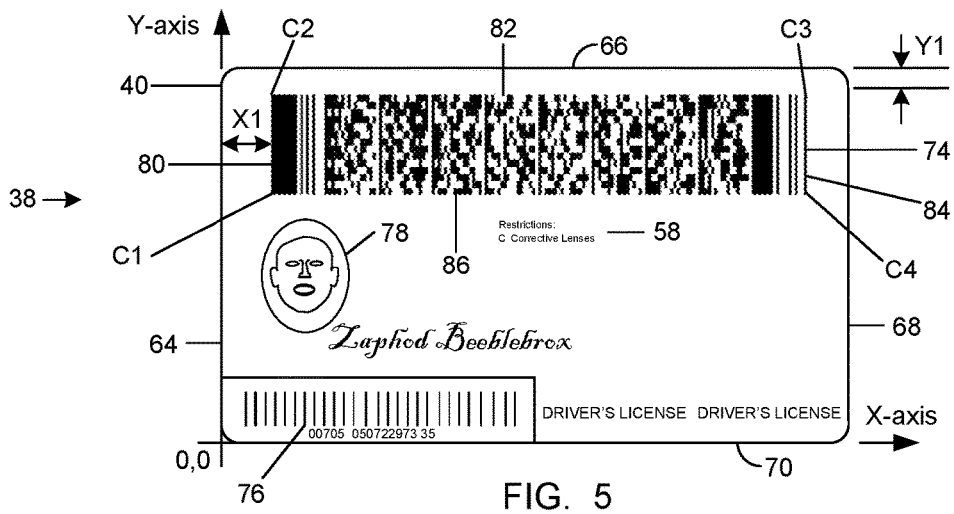
FIG. 5 is a diagram illustrating an image of an example second side of the identity document implemented using the ID-1 card type.

FIG. 5 is a diagram illustrating an image of an example second side of the identity document 40 implemented using the ID-1 card type standard. The image may be captured with the electronic device 10, the camera 14 or any other device included in the system 200 capable of communicating with the server 12 via the network 16.

A cartesian coordinate system including X and Y-axes may be mathematically positioned anywhere on or with respect to the second side of the identity document 40. The second side includes a PDF417 barcode 74, a one-dimensional barcode 76, an image 78 of the person for whom the license was issued, and the restrictions 58 the person is required to comply with while driving. The cartesian coordinate system may be used to facilitate calculating the dimensions of the PDF417 barcode 74, the location of the PDF417 barcode 74 on the second side, and the orientation of the PDF417 barcode 74 on the second side of the identity document 40. The information on the second side of the identity document 40 complies with the established criteria for the class to which the identity document 40 belongs.

The PDF417 barcode 74 is rectangular so has four corners C1, C2, C3, and C4 and four rectangular sides. The PDF417 barcode 74 includes a first rectangular side 80, a second rectangular side 82, a third rectangular side 84 and a fourth rectangular side 86. The first rectangular side 80 is parallel to the left edge 64, the second rectangular side 82 is parallel to the top edge 66, the third rectangular side 84 is parallel to the right edge 68, and the fourth rectangular side 86 is parallel to the bottom edge 70. Additionally, the PDF417 barcode 74 is located a distance X1 from the left edge 64 and a distance Y1 from the top edge 66.

The dimensions of the PDF417 barcode 74 can be calculated from the corners C1, C2, C3, and C4. Alternatively, the dimensions can be calculated in any manner, for example, by measuring the lengths of the rectangular sides 80, 82, 84, and 86.

Service providers typically require individuals to upload an image of his or her identity document, like a driver's license or an identification card, and a claim of identity to facilitate authentication. The uploaded image is typically analyzed to determine whether the identity document in the uploaded image is authentic. Imposters have been known to impersonate individuals by providing a false claim of identity supported by fraudulent identity documents when attempting to deceive a service provider into concluding the imposter is the person he or she claims to be. Additionally, impostors have been known to use many methods to obtain or create fraudulent identity documents. For example, imposters have been known to laminate another person's image onto their own identity document and to alter the text of another person's identity document. The imposters upload images of the altered documents, for example, when opening a bank account. Such fraudulent identity documents are difficult to detect by known systems.

Methods for automatically determining the authenticity of an identity document included in an image are known to analyze various features of the document. For example, such methods are known to analyze the text font to verify it comports with the appropriate standards for the respective class of document, determine whether security features are present, determine whether the color spectrum of the document is proper, and verify that the uploaded image was not taken of a photocopy. However, these methods generate less robust authenticity results than desired which can result in compromised security.

To address these problems the electronic device 10 may be used to capture image data of the PDF417 barcode located on an identity document which includes textual data. Data may be extracted from the PDF417 barcode and a class to which the identity document belongs may be determined using the extracted data. Data unique to the determined class may be identified in the extracted data. The unique data is in addition to the textual data on the first side of the identity document and represented in the PDF417 barcode. The identified unique data may be compared against unique data of any authenticated identity document of the determined class and an authenticity score may be calculated based on the comparison. In response to determining the authenticity score satisfies a threshold score, the identity document may be determined to be authentic.

Figure 6:
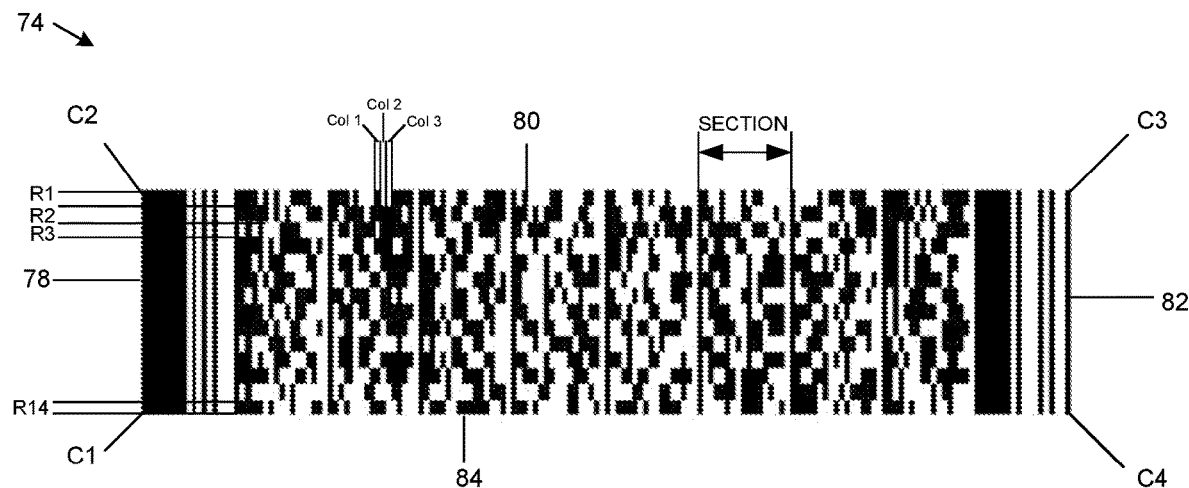
FIG. 6 is an expanded view of the example PDF417 barcode included on the second side of the identity document as shown in FIG. 5.

FIG. 6 is an expanded view of the PDF417 barcode 74 as shown in FIG. 5. The PDF417 barcode 74 includes fourteen rows and many columns. Alternatively, the PDF417 barcode 74 may include any number of rows and any number of columns that comply with class to which the identity document belongs. Four of the rows are designated as R1, R2, R3 and R14 while three columns are designated as Col 1, Col 2, and Col 3. Although four example row designations and three example column designations are shown, any number of row and column designations may be provided. The PDF417 barcode 74 includes several sections which each include clusters of codewords made from black ink and white spaces.

The codewords are the encoded information stored in PDF417 barcodes. The encoded information is typically for the identity information described herein that appears on the first side of the identity document 40.

The identity information obtained from the first side of the identity document 40 can be compared against the corresponding encoded information in the PDF417 barcode 74. If each item of identity information agrees with the corresponding encoded information in the PDF417 barcode, the identity document 40 may be authentic. However, if at least one item of identity information and corresponding encoded information disagree the identity document may be fraudulent.

Although the identity document 40 may be fraudulent if at least one item of identity information and corresponding encoded information disagree, it is contemplated by the present disclosure that an identity document may alternatively be considered authentic if one or more items of identity information and corresponding encoded information disagree. For example, the number of disagreements may be any number that provides a desired level of accuracy in authenticity detection results. The number of disagreements may depend on the number of items of identity information that are compared against corresponding items encoded information. For example, if there are twenty items of identifying information the number of permitted disagreements may be two (2).

Attackers are aware of the correspondence between the identity information on the first side and the encoded information in the PDF417 barcode 74. As a result, attackers are known to manufacture fraudulent identity documents including identity information on the first side and PDF417 barcodes encoding the same identity information on the second side. Attackers include, but are not limited to, nation-states, criminal organizations, malicious groups and individuals attempting to exploit the privacy of the Internet and cloud computing power to perpetuate fraud on a massive scale by taking advantage of known identity document processing liabilities and techniques. It can be difficult to detect fraudulent documents manufactured by attackers.

Figure 7:
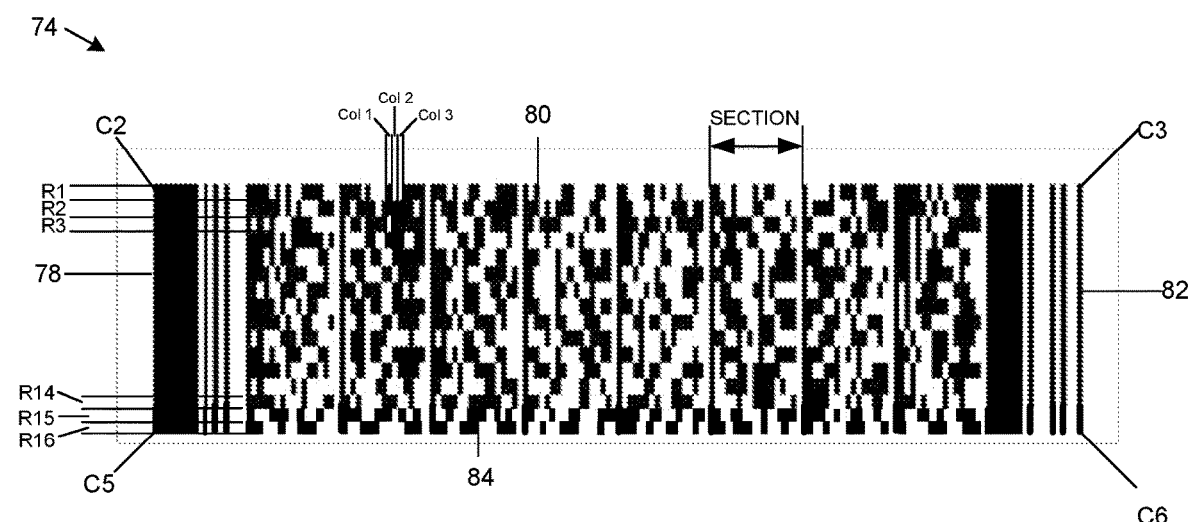
FIG. 7 is the expanded view of the PDF417 barcode as shown in FIG. 6, including two additional rows.

The information shown in FIG. 7 is the same information shown in FIG. 6 as described in more detail below. As such, features illustrated in FIG. 7 that are identical to features illustrated in FIG. 6 are identified using the same reference numerals used in FIG. 6.

FIG. 7 is the expanded view of the PDF417 barcode 74 as shown in FIG. 6, including two additional rows R15 and R16. The rows R15 and R16 may include unique data intentionally or unintentionally encoded in the PDF417 barcode 74 by the manufacturer of the identity document 40. Additionally, or alternatively, the unique data may be included in any row of the PDF417 barcode 74.

The unique data is unique to each class of identity document and typically does not match any of the identity information on the first side of the identity document 40 or data required to be encoded in the PDF417 barcode 74 for the respective class. The unique data is in addition to the identity information and any other textual information on the first side of the identity document 40. The unique data generally is not public so is unknown to attackers. As a result, the unique data can be used to facilitate differentiating between authentic and fraudulent identity documents. It should be understood that because the unique data is unique for each class of identity document it is different for each class of identity document.

The unique data can include intentionally encoded information, unintentionally encoded information, or any combination of intentionally and unintentionally encoded information. The unique data can be compared against decoded information from a PDF417 barcode included in an image of an identity document. If the PDF417 barcode includes the unique data, the identity document in the image may be authentic. Otherwise, the identity document in the image may be fraudulent.

Intentionally added unique data may include, but is not limited to, filler data, specified barcode information, incidental data, supplemental data, optional data, calculated data, designed data, hash data generated using a cryptographic function, encoded data, scrambled data, missing encoded data and misplaced data.

Any of the rows in the PDF417 barcode 74 may include sections with repeated code phrases. These repeated code phrases are filler data. The filler data is provided due to the changing quantity of data encoded in a PDF417 barcode and the requirement to satisfy barcode attributes such as barcode size and the number of rows and columns. The filler data may be, for example, filler code words.

Each different class of the type ID-1 identity document may have a different defined pattern of filler code words which may be used to differentiate authentic versus fraudulent identity documents. Thus, the pattern of the filler code words in the PDF417 barcode of an obtained identity document may be compared against the defined filler code word pattern for the class to which the obtained identity document belongs. If the patterns match, the obtained identity document may be authentic. Otherwise, the obtained identity document may be fraudulent. Alternatively, if the obtained identity document does not include filler data the identity document may be fraudulent.

Specified barcode information is information encoded in a PDF417 barcode that may be required to decode the PDF417 barcode. Such specified barcode information is defined by class and is typically kept secret by the identity document manufacturer. As a result, the specified barcode information itself may be used to differentiate between authentic and fraudulent identity documents. Thus, if the specified barcode information is included in a PDF417 barcode in an obtained identity document, the obtained identity document 40 may be authentic. However, if the specific barcode information is missing the obtained identity document may be fraudulent. Additionally, or alternatively, if the specific barcode information fails to agree with the defined specified barcode information the obtained identity document may be fraudulent. The specified barcode information may include, but is not limited to, a control number, a catalogue of control numbers, a serial number, and a hash of the identity information on the first side of the identity document.

Incidental data may include, but is not limited to, filler words, letters, symbols, numbers, sequences, spaces, codes, or empty spaces on any one of the parsed barcode rows of data to a particular class of ID-1 document.

Supplemental data may be any data, in addition to the data required to be included in the PDF417 barcode for a class of identity document, that can facilitate determining whether an identity document included in captured image data is authentic. Examples of supplemental data include, but are not limited to, an email address, a username and a pass phrase.

Optional data may be any data, in addition to the data required to be included in the PDF417 barcode for a class of identity document, that can facilitate determining whether an identity document included in captured image data is authentic. Examples of optional data include, but are not limited to, the name of the street a person lived on as a child, a person's social security number, and the maiden name of a person's mother.

Calculated data includes data calculated using any mathematical operation performed on any data available on the identity document 40, for example, the numbers from a person's birthdate, license number or renewal date. For example, the birth date 56 of the person to whom the identity document 40 was issued was Aug. 3, 1975 or 08/03/1975. Thus, any mathematical operation or combination of operations may be performed using any combination of the numbers 0, 0, 1, 3, 5, 7, 8, and 9. For example, the fifth number may be multiplied by the seventh number to yield a result. That is, five (5) times eight (8) equals forty (40). The result, or hash data generated from the result, may be encoded in a PDF417 barcode. The hash may be generated using any cryptographic function. Additionally, or alternatively, hash data may be generated from data unrelated to the identity document 40 using any cryptographic function and included in a PDF417 barcode.

Although numbers harvested from data included in the identity document are used in the above example, it is contemplated by the present disclosure that the numbers may be from any source other than the identity document and that textual data from the identity document may be converted into numerical data and used.

Scrambled data may represent any data encoded in a PDF417 barcode that matches data from the front of an identity document but is scrambled in the PDF417 barcode. For example, the numbers representing the person's date of birth may be scrambled.

It is contemplated by the present disclosure that intentionally added unique data may include data deliberately omitted from a PDF417 barcode. For example, the restrictions 58 may be deliberately omitted from the PDF417 barcode. Moreover, it is contemplated by the present disclosure that intentionally added unique data may include misplaced data. That is, data which is in a different location in a PDF417 barcode than required for the class to which the identity document belongs. For example, the restrictions may be omitted from the standard location and deliberately positioned in another location within a PDF417 barcode, for example, in either row R15 or R16.

Unintentionally added unique data may be caused by the type of printer, the printer supplies, or the temperature of the printer head while printing the PDF417 barcode for a certain class of identity document which may affect the quality of the printed PDF417 barcode. For example, the black ink may bleed or contract resulting in broader black space components and narrower white space components, or vice versa. As a result, the PDF417 barcode may include data different than intended or unintentionally added unique data. Such quality features may be an anomaly that can be used to differentiate between authentic and fraudulent identity documents for a certain class.

A machine learning model (MLM) may be trained to analyze the quality features of printed PDF417 barcodes in images of identity documents. If the quality features of an identity document included in an image match the quality features for the class to which the identity document belongs, the identity document may be authentic. Otherwise, the identity document may be fraudulent. Unless attackers used the same type of printer, the same supplies, and the same printer head temperature during printing, attackers would not be able to reproduce the anomaly. Thus, security would be enhanced.

In the same way that legitimate identity document manufacturers may intentionally or unintentionally include unique data in PDF417 barcodes, attackers may do the same. However, attackers typically unintentionally include unique data in PDF417 barcodes. Over time a certain kind of unique data may be associated with a certain attacker and used as a digital signature to identify fraudulent identity documents manufactured by the attacker. That is, any identity document that includes the unique data would be considered fraudulent and manufactured by the certain attacker.

FIG. 8 is a table 88 including example decoded PDF417 barcode 74 data. The table 88 includes twenty example items of data. Alternatively, the table 88 may include any number of items of data that correspond to the class to which the identity document 40 belongs. The table 88 includes data such as, but not limited to, the first 92 and last 90 names, date of birth 94, and address 96 of the person to whom the license was issued, as well as the customer identifier 98.

Most of the decoded PDF417 barcode data corresponds to the identity information on the first side of the identity document 40. For example, the first 92 and last 90 names, date of birth 94, and address 96 of the person to whom the license was issued correspond to the name 46, date of birth 56, and address 48 indicated on the first side of the identity document 40. The decoded PDF417 barcode data also includes unique additional data 100. The unique additional data 100 is filler data.

It is contemplated by the present disclosure that the unique data is unique to all the identity documents that belong to the same class. Thus, the unique data may be used to facilitate determining whether an identity document is authentic. For example, the unique data 100 may be compared against the corresponding unique data from any authenticated identity document that belongs to the same class as the identity document 40. If there is a match between the unique data, the identity document 40 may be authentic. Otherwise, the identity document 40 may be fraudulent. Additionally, or alternatively, if it is determined that the identity document does not include the unique data the identity document may be fraudulent.

Figures 9, 10:
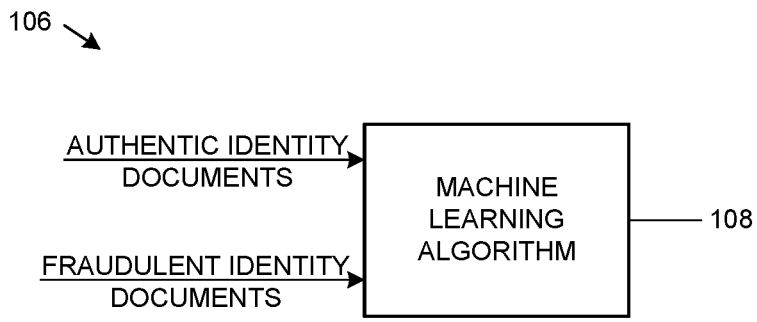
FIG. 9 is another table including example decoded PDF417 barcode data similar to the table as shown in FIG. 8, further including unintentionally generated unique data.
FIG. 10 is a diagram illustrating an example machine learning algorithm (MLA) for training an example machine learning model (MLM) for use in determining the authenticity of an identity document according to an embodiment of the present disclosure.

The information shown in FIG. 9 is the same information shown in FIG. 8 as described in more detail below. As such, features illustrated in FIG. 9 that are identical to features illustrated in FIG. 8 are identified using the same reference numerals used in FIG. 8.

FIG. 9 is a table 102 including example decoded PDF417 barcode data similar to the table 88 as shown in FIG. 8. However, instead of including the filler data 100 the table 102 includes unique data 104 unintentionally generated by the manufacturer of the identity document. For the example decoded PDF417 barcode data in table 102, the manufacturer is an attacker. Thus, the unique data 104 should not match against the unique data of an authenticated identity document belonging to the same class as the identity document 40. As a result, the identity document from which the PDF417 decoded data was taken may be fraudulent.

It is contemplated by the present disclosure that the unique data 104 is included in all identity documents manufactured by the attacker, and that the identity of the attacker may be learned over time. As a result, the unique data 104 may serve as a signature that enables identifying the attacker who manufactured the fraudulent identity document. Although the table 102 includes twenty items of data, the table 102 may alternatively include any number of items of data that correspond to the class to which the identity document 40 belongs.

Although the identity document whose PDF417 barcode data is included in the table 88 was manufactured by an attacker as described herein, it is contemplated by the present disclosure that the identity document may alternatively be manufactured by a legitimate entity.

FIG. 10 is a diagram 106 illustrating an example machine learning algorithm (MLA) 108 for training an example machine learning model (MLM) for use in determining the authenticity of an identity document according to an embodiment of the present disclosure. A database of images of ID-1 type identity documents may be classified according to the governmental entity that issued the identity document, the document category, the year the identity document was created, and the authentication status of each identity document using segmentation techniques. Some of the identity documents in the database are authentic and some are fraudulent.

The authentic and fraudulent identity documents are processed by the MLA 108 to generate a machine learning model that can be used to facilitate determining the authenticity of identity documents. For example, a weight normalization technique may be used during training.

Each class of identity document typically has a different number of identity documents. Classes with relatively low numbers of documents are typically underrepresented during training which decreases the accuracy and trustworthiness of trained MLMs. To enhance the accuracy of trained MLMs, such classes can be assigned a weight normalization value during training. The weight normalization values can be calculated from the number of documents in each class. The generated machine learning model (MLM) processes image data including identity document images to determine whether the identity document in the image data is authentic.

Figure 11:
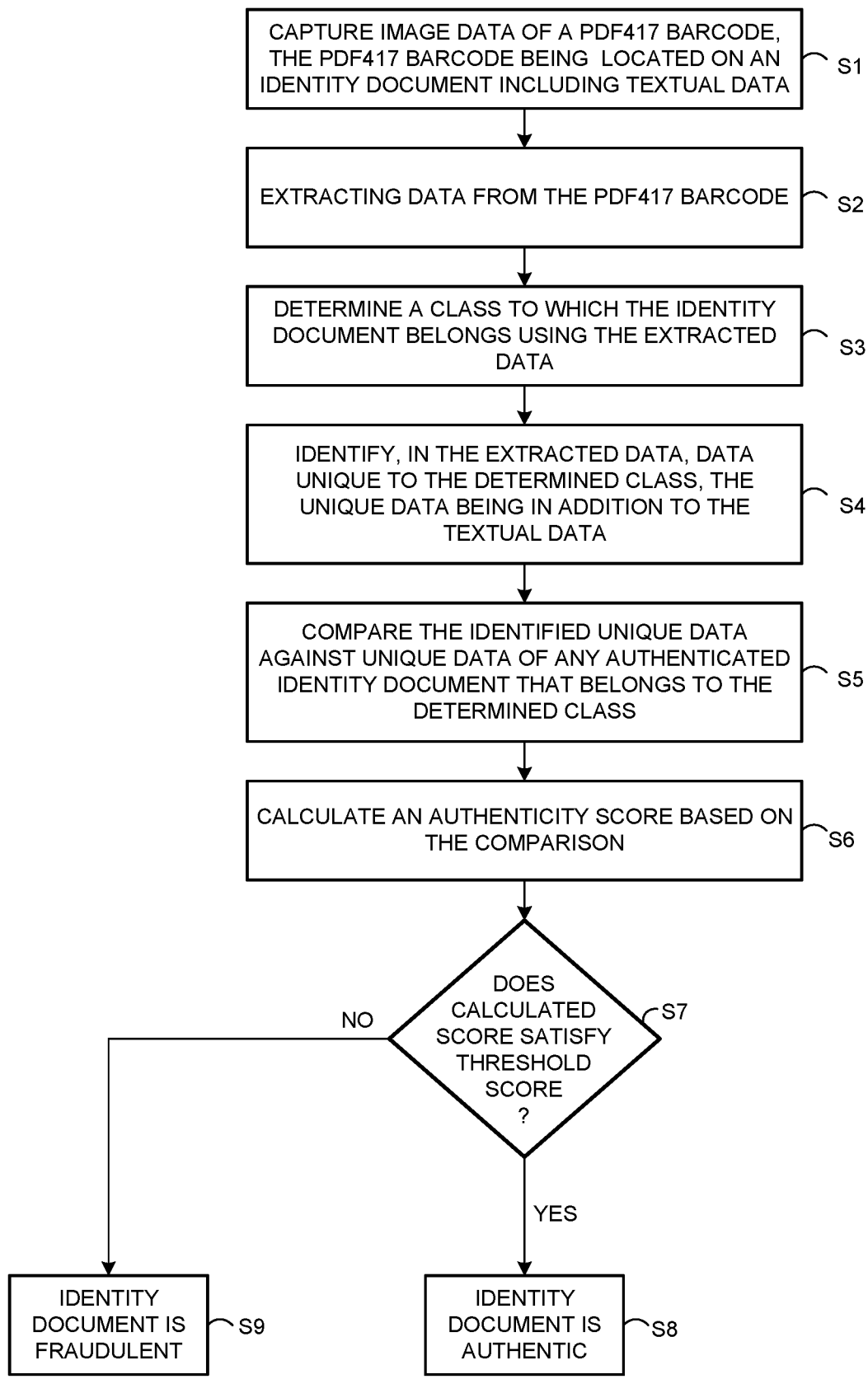
FIG. 11 is a flowchart illustrating an example method and algorithm for determining the authenticity of an identity document according to an embodiment of the present disclosure.

FIG. 11 is a flowchart illustrating an example method and algorithm for determining the authenticity of an identity document according to an embodiment of the present disclosure. FIG. 11 illustrates example steps performed when the electronic device 10 runs software 20b stored in the memory 20 to determine the authenticity of an identity document.

In step S1, the software 20b executed by the processor 18 causes the electronic device 10 to capture image data of a PDF417 barcode located on an identity document including textual data and, in step S2, to extract data from the PDF417 barcode. Next, in step S3, the software 20b executed by the processor 18 causes the electronic device 10 to determine a class to which the identity document belongs using the extracted data and, in step S4, to identify in the extracted data, data unique to the determined class. The unique data is in addition to the textual data.

Next, in step S5, the software 20b executed by the processor 18 causes the electronic device 10 to compare the identified unique data against unique data of any authenticated identity document that belongs to the determined class, and in step S6, to calculate an authenticity score based on the comparison. An authenticated identity document is an identity document that has been proven to be authentic either using the example methods and algorithms described herein or using any other method that generates accurate and trustworthy authenticity results.

In step S7, the software 20b executed by the processor 18 causes the electronic device 10 to determine whether the authenticity score satisfies a threshold score. If so, in step S8, the software 20b executed by the processor 18 causes the electronic device 10 to determine the identity document is authentic. Otherwise, in step S9, the software 20b executed by the processor 18 causes the electronic device 10 to determine the identity document is fraudulent. It is contemplated by the present disclosure that the authenticity score may satisfy the threshold score when the authenticity score is equal to or greater than the threshold score, greater than the threshold score, less than the threshold score, or less than or equal to the threshold score depending on the design of the algorithm.

Although the example method and algorithm for determining the authenticity of an identity document described herein determines the authenticity of an identity document based on unique data, it is contemplated by the present disclosure that the captured image data may additionally, or alternatively, be analyzed to confirm the original identity document was present when the image data was captured. That is, determine whether the identity document in the captured image data was a live document. For example, the image data may be analyzed to confirm the identity document was not a photograph of the original document, not a computer screen shot of the original identity document, or that the original identity document was not otherwise spoofed.

Using the method and algorithm for determining the authenticity of a document as described herein enables quickly determining whether image data includes an image of an authentic identity document. As a result, the method and algorithm facilitate enhancing the accuracy and trustworthiness of identity document review results while enhancing security and facilitating a reduction in review costs.

It is contemplated by the present disclosure that the example methods and algorithms described herein may be conducted entirely by the electronic device 10; partly by the electronic device 10 and partly by the server 12; partly by the electronic device 10, partly by the camera 14 and partly by the server 12; partly by the camera 14 and partly by the server 12; entirely by the camera 14; or, by any other combination of other servers (not shown), electronic devices (not shown), or computers (not shown) operable to communicate with the electronic device 10, the server 12, and the camera 14 via the network 16. Furthermore, data described herein as being stored in the electronic device 10 may alternatively, or additionally, be stored in any other server (not shown), electronic device (not shown), or computer (not shown) operable to communicate with the electronic device 10 via a network.

Additionally, the example methods and algorithms described herein may be implemented with any number and organization of computer program components. Thus, the methods and algorithms described herein are not limited to specific computer-executable instructions. Alternative example methods and algorithms may include different computer-executable instructions or components having more or less functionality than described herein.

The example methods and/or algorithms described above should not be considered to imply a fixed order for performing the method and/or algorithm steps. Rather, the method and/or algorithm steps may be performed in any order that is practicable, including simultaneous performance of at least some steps. Moreover, the method and/or algorithm steps may be performed in real time or in near real time. It should be understood that for any method and/or algorithm described herein, there can be additional, fewer, or alternative steps performed in similar or alternative orders, or in parallel, within the scope of the various embodiments, unless otherwise stated. Furthermore, the invention is not limited to the embodiments of the methods and/or algorithms described above in detail.

What is claimed is:

1. A method for determining the authenticity of an identity document comprising the steps of:
    capturing, by an electronic device, image data of a PDF417 barcode, the PDF417 barcode being located on an identity document including textual data;
    extracting data from the PDF417 barcode;
    determining a class to which the identity document belongs using the extracted data;
    identifying in the extracted data, data unique to the determined class, the unique data being in addition to the textual data;
    comparing the identified unique data against unique data of any authenticated identity document belonging to the determined class;
    calculating an authenticity score based on the comparison; and
    in response to determining the authenticity score satisfies a threshold score, determining the identity document is authentic.

2. The method according to claim 1, further comprising the steps of:
    when the authenticity score fails to satisfy the threshold score, comparing the identified unique data against the unique data in each fraudulent identity document included in a database of fraudulent identity documents, wherein each fraudulent identity document is associated with a manufacturer; and
    when the identified unique data matches the unique data in at least one fraudulent identity document, determining the manufacturer of the identity document including the identified unique data.

3. The method according to claim 1, further comprising the step of determining the identity document is fraudulent in response to determining the authenticity score fails to satisfy the threshold score.

4. The method according to claim 1, said identifying step comprising the steps of:
    searching the extracted data to identify the unique data; and
    in response to failing to identify the unique data, determining the identity document is fraudulent.

5. The method according to claim 1, wherein the identity document includes a first side and a second side, said capturing step comprising the steps of:
    capturing an image of the first side of the identity document, the first side of the identity document including the textual data; and
    capturing an image of the second side of the identity document, the second side of the identity document including the PDF417 barcode.

6. The method according to claim 1, wherein the identified unique data was intentionally included in the PDF417 barcode by a manufacturer of the PDF417 barcode.

7. The method according to claim 1, wherein the identified unique data was unintentionally included in the PDF417 barcode by a manufacturer of the PDF417 barcode.

8. An electronic device for determining authenticity of an identity document comprising:
    a processor; and
    a memory configured to store data, said electronic device being associated with a network and said memory being in communication with said processor and having instructions stored thereon which, when read and executed by said processor, cause said electronic device to:
    receive image data of a PDF417 barcode, the PDF417 barcode being located on an identity document including textual data;
    extract data from the PDF417 barcode;
    determine a class to which the identity document belongs using the extracted data;
    identify in the extracted data, data unique to the determined class, the unique data being in addition to the textual data;
    compare the identified unique data against unique data of any authenticated identity document belonging to the determined class;
    calculate an authenticity score based on the comparison; and
    in response to determining the authenticity score satisfies a threshold score, determine the identity document is authentic.

9. The electronic device according to claim 8, wherein the instructions when read and executed by said processor, cause said electronic device to:
    when the authenticity score fails to satisfy the threshold score, compare the identified unique data against the unique data in each fraudulent identity document included in a database of fraudulent identity documents, wherein each fraudulent identity document is associated with a manufacturer; and
    when the identified unique data matches the unique data in at least one fraudulent identity document, determine the manufacturer of the identity document including the identified unique data.

10. The electronic device according to claim 8, wherein the instructions when read and executed by said processor, cause said electronic device to determine the identity document is fraudulent in response to determining the authenticity score fails to satisfy the threshold score.

11. The electronic device according to claim 8, wherein the instructions when read and executed by said processor, cause said electronic device to:
    search the extracted data to identify the unique data; and
    in response to failing to identify the unique data, determine the identity document is fraudulent.

12. The electronic device according to claim 8, wherein the identity document includes a first side and a second side and the instructions when read and executed by said processor, cause said electronic device to:
    capture an image of the first side of the identity document, the first side of the identity document including the textual data; and
    capture an image of the second side of the identity document, the second side of the identity document including the PDF417 barcode.

13. The electronic device according to claim 8, wherein the identified unique data was intentionally included in the PDF417 barcode by a manufacturer of the PDF417 barcode.

14. The electronic device according to claim 8, wherein the identified unique data was unintentionally included in the PDF417 barcode by a manufacturer of the PDF417 barcode.

15. A non-transitory computer-readable recording medium in an electronic device for determining authenticity of an identity document, the non-transitory computer-readable recording medium storing instructions which when executed by a hardware processor cause the non-transitory recording medium to perform steps comprising:
- capturing image data of a PDF417 barcode, the PDF417 barcode being located on an identity document including textual data;
- extracting data from the PDF417 barcode;
- determining a class to which the identity document belongs using the extracted data;
- identifying in the extracted data, data unique to the determined class, the unique data being in addition to the textual data;
- comparing the identified unique data against unique data of any authenticated identity document belonging to the determined class;
- calculating an authenticity score based on the comparison; and
- in response to determining the authenticity score satisfies a threshold score, determining the identity document is authentic.

16. The non-transitory computer-readable recording medium according to claim 15, wherein the instructions when read and executed by said processor, cause said non-transitory computer-readable recording medium to perform steps compromising:
- when the authenticity score fails to satisfy the threshold score, comparing the identified unique data against the unique data in each fraudulent identity document included in a database of fraudulent identity documents, wherein each fraudulent identity document is associated with a manufacturer; and
- when the identified unique data matches the unique data in at least one fraudulent identity document, determining the manufacturer of the identity document including the identified unique data.

17. The non-transitory computer-readable recording medium according to claim 15, wherein the instructions when read and executed by said processor, cause said non-transitory computer-readable recording medium to perform the step of determining the identity document is fraudulent in response to determining the authenticity score fails to satisfy the threshold score.

18. The non-transitory computer-readable recording medium according to claim 15, wherein the instructions when read and executed by said processor, cause said non-transitory computer-readable recording medium to perform the steps of:
- searching the extracted data to identify the unique data; and
- in response to failing to identify the unique data, determining the identity document is fraudulent.

19. The non-transitory computer-readable recording medium according to claim 15, wherein the identity document includes a first side and a second side and the instructions when read and executed by said processor, cause said non-transitory computer-readable recording medium to perform the steps of:
- capturing an image of the first side of the identity document, the first side of the identity document including the textual data; and
- capturing an image of the second side of the identity document, the second side of the identity document including the PDF417 barcode.

20. The non-transitory computer-readable recording medium according to claim 15, wherein the identified unique data was intentionally included in the PDF417 barcode by a manufacturer of the PDF417 barcode.

* * * * *